(12) United States Patent
Conover (10) Patent No.: US 8,397,242 B1
(45) Date of Patent: Mar. 12, 2013

(54) SYSTEM AND METHOD FOR MANAGING OPERATIONS WITHIN VIRTUAL MACHINES

(75) Inventor: Matthew Conover, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 820 days.

(21) Appl. No.: 12/495,556

(22) Filed: Jun. 30, 2009

(51) Int. Cl.
*G06F 3/00* (2006.01)
*G06F 9/455* (2006.01)

(52) U.S. Cl. ............................................. 719/313; 718/1
(58) Field of Classification Search .................. None
See application file for complete search history.

(56) References Cited

U.S. PATENT DOCUMENTS

| | | | |
|---|---|---|---|
| 7,424,710 B1 * | 9/2008 | Nelson et al. ................. | 719/313 |
| 7,996,835 B2 * | 8/2011 | Griffith et al. ................ | 719/313 |
| 2004/0064668 A1 * | 4/2004 | Kjos et al. ..................... | 711/202 |
| 2005/0235123 A1 * | 10/2005 | Zimmer et al. ............... | 711/170 |
| 2007/0016895 A1 * | 1/2007 | Tan ................................ | 717/136 |
| 2007/0088822 A1 * | 4/2007 | Coile et al. .................... | 709/224 |
| 2007/0130566 A1 * | 6/2007 | van Rietschote et al. ......... | 718/1 |
| 2008/0114916 A1 * | 5/2008 | Hummel et al. ............... | 710/266 |
| 2009/0187904 A1 * | 7/2009 | Serebrin et al. ................. | 718/1 |
| 2010/0023941 A1 * | 1/2010 | Iwamatsu et al. ................. | 718/1 |
| 2010/0058338 A1 * | 3/2010 | Schneider ......................... | 718/1 |
| 2010/0131669 A1 * | 5/2010 | Srinivas et al. ............... | 709/233 |

OTHER PUBLICATIONS

Introducing Role-based Access Control to a Secure Virtual Machine Monitor, Manabu Hirano et al., 2008, pp. 1-6.*
Hypervisor-Based Instrusion Detection, Lionel Litty, 2005, pp. 1-83.*
I/O Processing in a Virtualized Platform, 2007, pp. 1-10.*
The new approach for inter-communication between guest domains on Virtual Machine Monitor, 2007, pp. 1-6.*

* cited by examiner

*Primary Examiner* — Andy Ho
*Assistant Examiner* — Tuan Dao
(74) *Attorney, Agent, or Firm* — Campbell Stephenson LLP (57) ABSTRACT

A method, apparatus, and computer-readable storage medium for managing operations within virtual machines are provided. According to one embodiment, a virtual machine manager monitors the internal operations of the virtual machines by redirecting a reference from a first address to a second address. The first address is an address of a function to be executed by the virtual machine. The second address is an address of a memory location in the memory page. The virtual machine manager installs an execution event at the memory location. In response to a request resulting in the memory location being accessed, an execution event is triggered. In response to the triggering of the execution event, a message is sent to the hypervisor. The message indicates that the memory location has been accessed.

20 Claims, 7 Drawing Sheets

SYSTEM AND METHOD FOR MANAGING OPERATIONS WITHIN VIRTUAL MACHINES

FIELD OF THE INVENTION

This invention relates to data processing systems, and in particular, managing virtual data processing systems.

DESCRIPTION OF THE RELATED ART

As modern computers become more powerful, the use of hardware and software virtualization to implement virtual machines is becoming more common. Virtual machines are software implementations of a physical computer that execute computer instructions in the manner of physical computer hardware. Whether a single computer or a group of networked computers, many (if not most) of today's computer systems are able to act as a host computer system to multiple virtual machines.

A computer system supporting multiple virtual machines typically does so, at least in part, through the use of system software and/or hardware that manages the host computer system's resources in a manner that allows the host computer system to present a hosted virtual environment to each of the virtual machines. In so doing, each virtual machine is able to operate as if the host computer system were solely under its control, and so share the host computer system's resources. For example, the host computer system will typically include at least one processor and system memory. The aforementioned system software and/or hardware supports the sharing of these resources by providing processor resources and memory management to each of the virtual machines. Such virtualization functionality can be provided, for example, through the use of a system virtual machine (sometimes referred to as hardware virtual machine), which allows the sharing of the underlying physical machine resources between different virtual machines, each running its own operating system (OS; which can vary from virtual-machine-to-virtual-machine, or can be the same OS across all the virtual machines).

However, in order for the virtual machines to successfully co-exist with one another, the system software and/or hardware also needs to be able coordinate and manage these demands for host computer system resources, typically. These needs are addressed by a virtualization component (e.g., a software abstraction layer) that is commonly referred to as a "hypervisor." A hypervisor can be executed on "bare hardware" (i.e., execute on physical hardware, without need for intervening software; and which is also referred to as a native virtual machine), or alternatively, can interface with the physical hardware via an operating system (also referred to as a hosted virtual machine). As will be appreciated, however, one or more of a hypervisor's functions can be implemented directly in hardware, rather than being implemented in software. Using the foregoing example, a hypervisor supports multiple virtual machines by coordinating processor resources to support the execution of instructions on behalf of the various virtual machines, and performing memory management to help ensure that the virtual machines effectively share the host computer's system memory, for example.

While the implementation of multiple virtual machines provides a number of benefits, such benefits often come at a price. For example, in the case in which multiple virtual machines each execute a copy of the same OS, the virtual machines' isolation from one another can lead to significant redundancy among the software modules of the virtual machines' operating systems. In such a situation, each virtual machine individually executes its own copy of various utilities, applications, system software and the like. As a result of their being executed independently, such copies are necessarily redundant to one another. Such redundancy results in the needless consumption of the host computer's system resources.

What is therefore desirable is an approach that provides support for multiple virtual machines, while reducing consumption of host computer system resources caused by the execution of redundant copies of a given software module.

SUMMARY OF THE INVENTION

According to one embodiment, a virtual machine manager monitors the internal operations of the virtual machines by redirecting a reference from a first address to a second address. The first address is an address of a function to be executed by the virtual machine. The second address is an address of a memory location in the memory page. The virtual machine manager installs an execution event at the memory location. In response to a request resulting in the memory location being accessed, an execution event is triggered. In response to the triggering of the execution event, a message is sent to the hypervisor. The message indicates that the memory location has been accessed.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Introduction

An advantageous feature of a host computer system that supports multiple virtual machines is the ability to support a variety of operating systems (OSs), such as Windows XP®, Windows Vista®, Linux, Mac OS X®, and the like, on the host computer system. Alternatively, the virtual machines can employ a single type of operating system, and still enjoy the benefits of multiple separate operating environments. In such an architecture, each of the virtual machines (also referred to herein as a "guest virtual machine") execute a corresponding one of the OSs (referred to herein as a "guest operating system"). A given guest operating system is thus executed within a corresponding one of the guest virtual machines.

As a result of this architecture, the guest virtual machines are logically isolated from one another, as noted. This logical isolation provides many benefits, including, but not limited to, security benefits. For example, if a guest virtual machine becomes corrupted by malicious software, a system administrator can remove the corrupted guest virtual machine and install a new replacement guest virtual machine without affecting the operation of other guest virtual machines executing on the host computer. As noted earlier, a hypervisor can be used to provide the ability for the host computer to implement multiple guest virtual machines, and to monitor and manage functions called by those guest virtual machines.

In the case in which multiple virtual machines each execute a copy of the same OS, the isolation of the virtual machines from one another often leads to significant redundancy among the virtual machines. For example, a host computer can be configured to implement multiple virtual machines, each of which employ an installation of Windows XP®. Each of these virtual machines can individually execute an anti-virus utility, a defragmentation utility, a word processing application, an Internet browsing application and other such utilities, applications and the like. As will be appreciated, this results in the execution of multiple copies of such utilities and applications that, while isolated from each other, are redundant. These redundant instances result in needless consumption of the host computer's system resources. As will also be appreciated, such redundancy can also exist between different OSs, though typically to a lesser extent.

One way to reduce redundant kernel functionality and/or code among the virtual machines is through a technique referred to as kernel component refactoring. Kernel component refactoring removes common kernel components shared by the virtual machines running on the same host computer, and executes the kernel components in a separate virtual machine, referred to as a virtual appliance. As will be appreciated in light of the present disclosure, component refactoring can be applied to any sort of redundant functionality and/or code among multiple virtual machines, and as such, is not limited to redundant kernel functionality and/or code. Via the hypervisor, the virtual appliance is able to monitor the other virtual machines supported by the host computer system. In response to such monitoring, the virtual appliance can perform any number of functions. Such functions can include maintenance operations, for example, which, in turn, can include firewall maintenance, volume management, input/output (I/O) change tracking, memory decompression and decryption, scanning for malicious software, and the like. Further, not only can redundancy in functionality and/or code be addressed, but such techniques can be used to reduce or eliminate redundancy in the operations to be performed. For example, in the case of scanning for malicious software (anti-virus scanning), if the virtual appliance scans a first file in a first virtual machine, the anti-virus scanner can forego scanning a second file in a second virtual machine, if the first and second files are identical.

While moving common kernel components to a virtual appliance reduces redundancy that might otherwise exist as a result of supporting multiple virtual machines, security-related kernel components such as malicious software scanners or software firewalls are also isolated from being compromised by malicious software found in corrupted virtual machines. However, while the isolation of common kernel components reduces redundancy and protects these components, common kernel components need a way to monitor the operation of the multiple virtual machines to determine when the functions of the common kernel components are needed, such as, for example, in the event of certain code being executed within one or more of the virtual machines.

One technique used to monitor code execution within virtual machines involves inserting breakpoints into the code executed by the virtual machines. However, some virtual machine implementations limit the code granularity at which breakpoints can be inserted. For example, some virtual machine implementations limit breakpoints to insertion at the memory page level. That is, such techniques mandate that a breakpoint only be inserted on a per page basis, and the location of the breakpoint cannot be specified with any more precision than being associated with a particular memory page. Moreover, if a particular section of code to be monitored is located in a memory page that is called frequently during code execution, the breakpoint will also be triggered frequently, causing performance degradation.

To address these and other disadvantages of such techniques, embodiments of the present invention monitor and augment code execution within guest virtual machines using, for example, a function hooking technique. Moreover, such embodiments are able to do so without injecting foreign code (e.g., breakpoints) into the code being executed by the guest virtual machine, and with minimal performance impact on the performance of the guest virtual machine. In one embodiment, then, a virtual machine manager monitors the internal operations of the virtual machines by redirecting a reference to a first address to a second address. The first address is an address of a function to be executed by the virtual machine, while the second address is the address of a memory location in a memory page. The virtual machine manager installs an execution event at the memory location in the memory page. In response to a request that results in the memory location being accessed, an execution event is triggered. In response to the triggering of the execution event, a message is sent to the hypervisor. The message indicates to the hypervisor that the memory location has been accessed. The hypervisor, having been apprised of the situation, is then able to proceed with performing one or more operations that have been associated with the function.

An Example Architecture for Managing Operations Within Guest Virtual Machines

Figure 1:
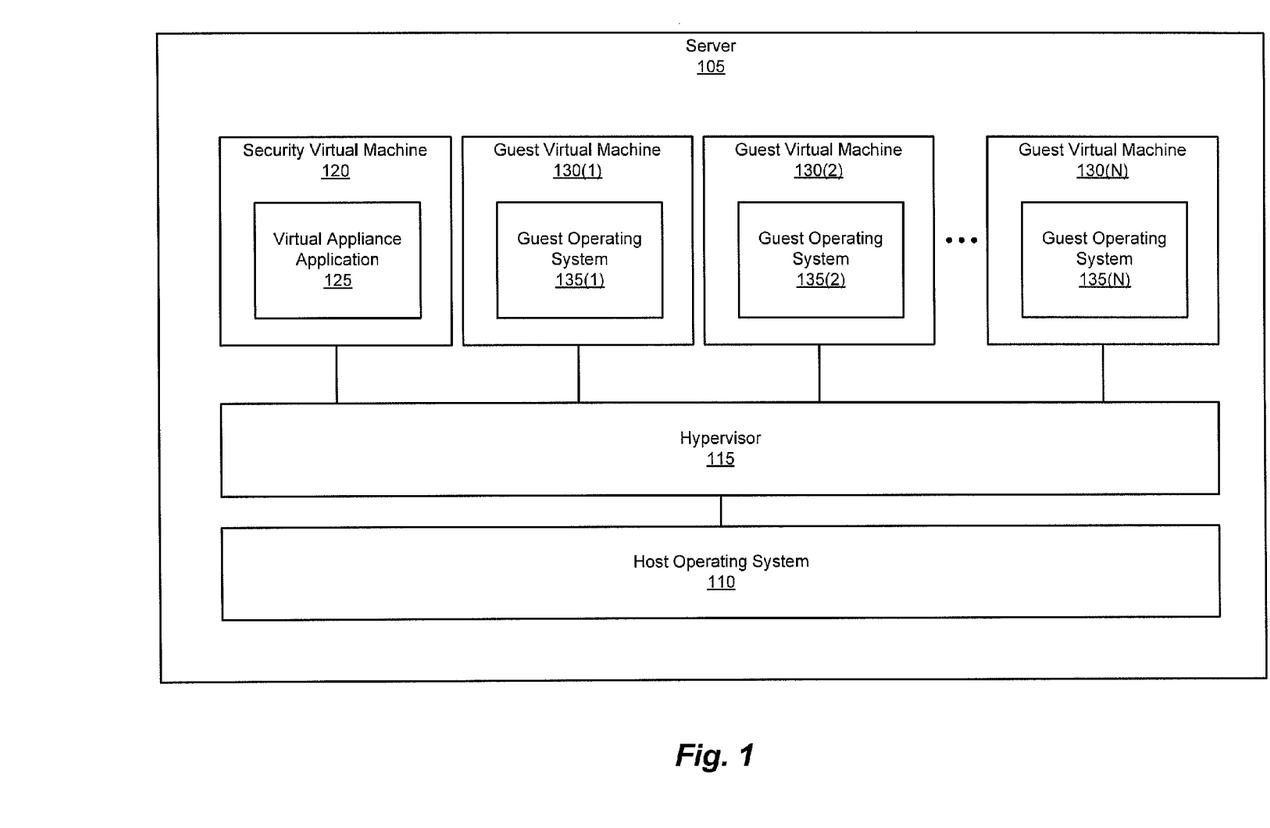
FIG. 1 is a block diagram illustrating a server that can be implemented as a host computer system, according to one embodiment.

FIG. 1 is a simplified block diagram that illustrates a server that can be used to communicate with clients. For example, as described subsequently in conjunction with FIG. 5, a server can communicate with the clients via a direct connection or a connection via a network, such as the Internet. Those with skill in the art will appreciate that a server is only an example of any number of computer systems that can be used. As illustrated, server 105 includes a host operating system 110, a hypervisor 115, a security virtual machine 120, which further includes a virtual appliance application 125, and guest virtual machines 130(1)-(N), which further include guest operating systems 135(1)-(N).

Host operating system 110 is the OS that underlies hypervisor 115, security virtual machine 120, and guest virtual machines 130(1)-(N). Hypervisor 115 is software and/or hardware that provides server 105 the ability to concurrently execute multiple guest operating systems (e.g. guest operating systems 135(1)-(N)) via guest virtual machines 130(1)-(N). Also, as illustrated, server 105 includes a security virtual machine 120, which executes virtual appliance application 125. Virtual appliance application 125, executing on security virtual machine 120, includes common kernel components shared by guest operating systems 135(1)-(N) executing on guest virtual machines 130(1)-(N). Example functions that virtual appliance application 125 performs on behalf of guest virtual machines 130(1)-(N) include firewall maintenance, anti-virus scanning, volume management, I/O change tracking, memory decompression and decryption and the like.

By implementing virtual appliance application 125, the functionalities that would have been performed by each guest operating system 135(1)-(N) are centralized in virtual appliance application 125, which reduces redundancy among guest operating systems 135(1)-(N). As described subsequently in further detail in conjunction with FIGS. 2A, 2B, 3, and 4, virtual appliance application 125, through hypervisor 115, monitors the execution of guest operating systems 135 (1)-(N). In response to a particular guest operating system (e.g., guest operating system 135(1)) calling certain functions during its execution, virtual appliance application 125 takes temporary control of the particular guest virtual machine (e.g., guest virtual machine 130(1)) that is executing that particular guest operating system. Virtual appliance application 125 performs an operation on the guest virtual machine and then, returns control to the guest virtual machine. In order to detect the execution of certain functions in guest virtual machines 130(1)-(N), some embodiments implement function monitoring and modification (hereinafter referred to as "function hooking") techniques that alert virtual appliance application 125 (via hypervisor 115) when a guest operating system of a guest virtual machine calls certain functions. Function hooking enables the altering or augmenting the behavior of an OS or application without access to the OS or application source code.

Figure 2A:
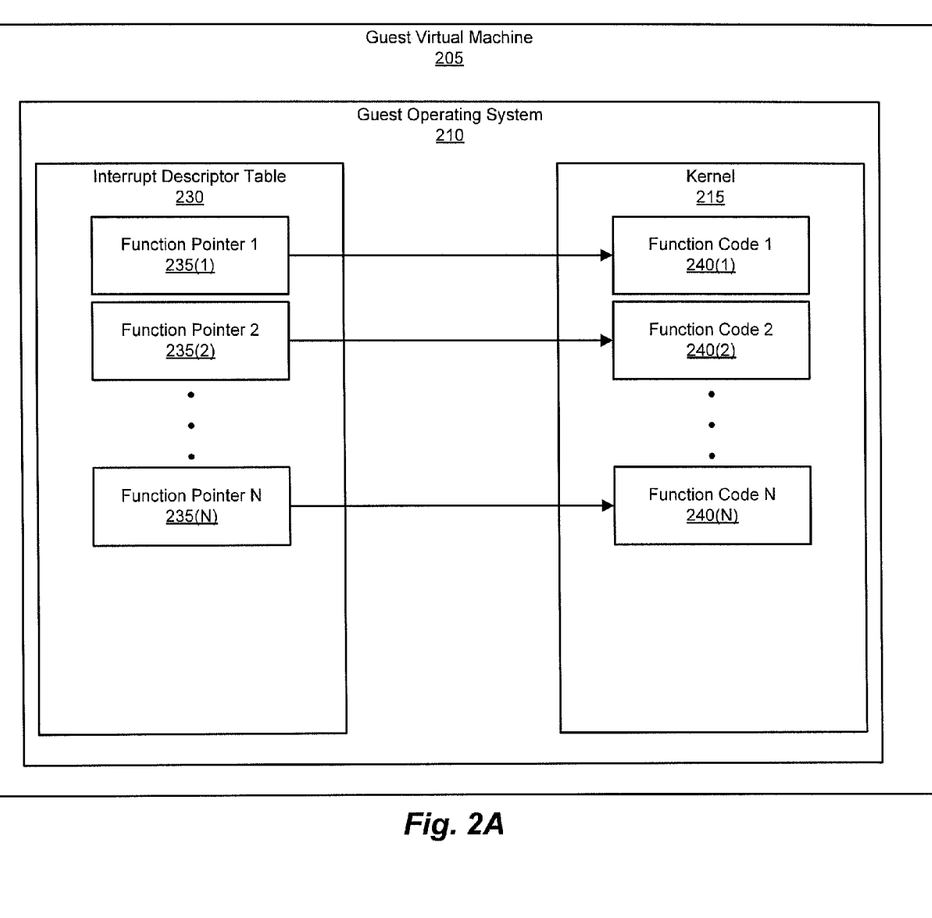
FIG. 2A is a block diagram illustrating a guest virtual machine, according to one embodiment.

FIG. 2A is a diagram of a guest virtual machine with function pointers mapped to function code in a guest operating system kernel. As illustrated, guest virtual machine 205 (which can be used to implement guest virtual machines 130(1)-(N) of FIG. 1) includes a guest operating system 210 (which can be used to implement guest operating systems 135(1)-(N) of FIG. 1). Guest operating system 210 further includes a kernel 215 and an interrupt descriptor table 230.

Kernel 215 is a basic component of guest operating system 210 and is responsible for managing system resources of guest virtual machine 205. For example, kernel 215 manages the communication between hardware and software components within guest virtual machine 205.

A computer system, whether real or virtual, performs many different tasks through various hardware and software components. For example, a computer system can accomplish these tasks by performing function calls to effect the desired operation(s). Examples of functions that a computer system might employ include functions that cause a video adapter to display image data on the computer system's video display, those that cause an input/output (I/O) adapter to accept input presented by an input device, those that cause a storage device adapter to enable read and write access to a storage device (e.g., hard disk drive, flash drive, or the like), and those that cause an anti-virus utility to scan various storage devices of the computer system for malicious software, among a wide variety of such functions and others. One approach to handling these different tasks is to send a request to the given hardware or software component (e.g., make a function call), requesting that the given hardware or software component perform one or more operations, and then wait for the operation(s) to complete. A more efficient technique involves sending such a request (again, making a function call, for example), and then performing other operations, while awaiting receipt of a notification indicating that the requested operation has completed. Such a notification can be implemented as an interrupt, for example. An interrupt is an asynchronous signal or message indicating need for attention or a synchronous event indicating need for a change in program execution.

As illustrated in FIG. 2A, guest virtual machine 205 supports the receipt and processing of interrupts using interrupt descriptor table 230. According to one embodiment, interrupt descriptor table 230 is a data structure used by a microprocessor architecture such as, for example, an x86 architecture, to implement an interrupt vector table. Interrupt descriptor table 230 is used by guest virtual machine 205 to determine appropriate responses to received interrupts. An interrupt vector can be implemented as an address of an interrupt handler.

Embodiments of the present invention can utilize pointers to reference interrupt vectors, for example. A pointer is a programmatic construct, the value of which refers to ("points to") another location in a computer-readable storage medium, typically a computer system's memory. Thus, when an interrupt is received, guest virtual machine 205 saves a current execution state (i.e., saves the location in code where the guest virtual machine was executing upon receipt of the interrupt, the value of any variables and other pertinent information). Guest virtual machine 205 then matches the received interrupt with a corresponding interrupt vector in interrupt descriptor table 230 (as referenced by function pointers depicted in FIG. 2A as function pointers 235(1)-(N); labeled in FIG. 2A as Function Pointers 1-N). Guest virtual machine 205 then begins execution of the interrupt handler referenced by the given function pointer (depicted in FIG. 2A as function codes 240(1)-(N) in kernel 215; labeled in FIG. 2A as Function Pointers 1-N). For example, if the function associated with Function Pointer 1 (e.g., a function named Function 1) was the function to be executed, Function Code 1 would be executed. The interrupt vector for Function Code 1 is the address of Function Code 1, which is the address pointed to by Function Pointer 1. A function pointer is a pointer that references an address, such as the address of a memory location at which the storage of the program code begins, for example. When a processor is to execute a function, the processor will typically begin execution of the function at this point in memory.

Figure 2B:
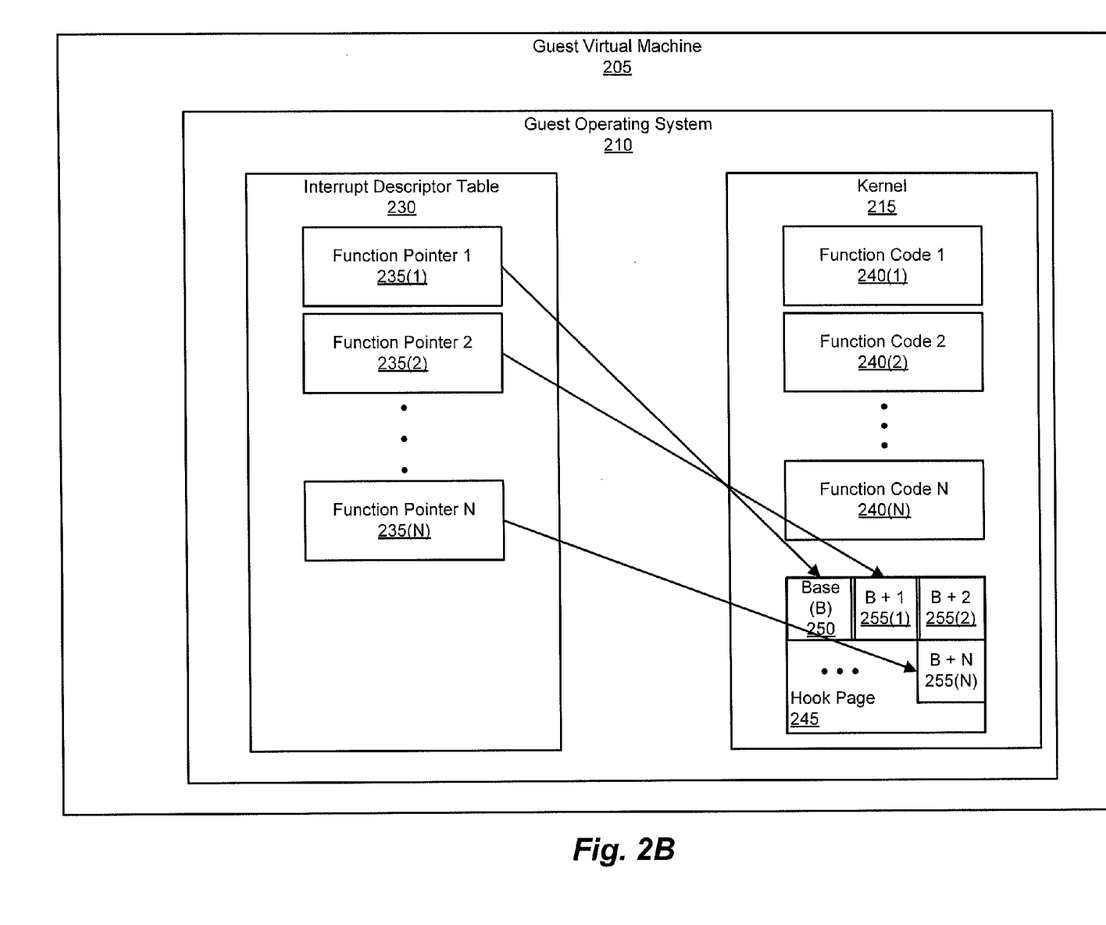
FIG. 2B is a block diagram illustrating a guest virtual machine with redirected function pointers, according to one embodiment.

FIG. 2B is diagram illustrating a guest virtual machine with redirected pointers that can be implemented within a host computer system. According to FIG. 2B, guest virtual machine includes a hook page 245 located within kernel 215. According to an embodiment, hook page 245 is a non-pageable memory page located in the memory of guest virtual machine 205. Hook page 245 contains no function code and is mapped in memory. A memory page is a fixed-length, logically contiguous block of memory. A non-pageable memory page is a memory page that remains in physical memory and is not transferred to an auxiliary memory store such as, for example, a hard disk drive or other type of memory device, in order to free space in the physical memory.

According to one embodiment, the size of hook page 245 is 4,096 bytes, which is the page size commonly implemented by the x86 architecture. As will be appreciated, any page size can be employed, and so hook page 245 is therefore not limited to a size of 4,096 bytes. Hook page 245 is located starting at a base memory location 250. In this example, hook page 245 is referenced by a base physical address within kernel 215 (e.g., 0x10000). Hook page 245 includes a number of memory locations that are referenced with respect to the base physical address of base memory location 250 using memory location offsets (e.g., memory location B+1; memory location B+2; and memory location B+N). For example, memory location B+1 is referred to using the base physical address of base memory location 250 (B), plus an offset of 1.

According to one embodiment, hook page 245 includes an execution event (not pictured) installed at base memory location 250. When triggered, the execution event causes a message to be sent to a hypervisor (e.g., hypervisor 115 of FIG. 1) to determine the function called by guest virtual machine 205. The installation and operation of the execution event is discussed subsequently in connection with FIGS. 3 and 4.

Also illustrated in FIG. 2B is the redirection of function pointers 235(1), 235(2), and 235(N). In FIG. 2B, function pointers 235(1), 235(2) and 235(N) are redirected from the original memory locations illustrated in FIG. 2A, to the memory locations in hook page 245. Function pointer 235(1) is therefore redirected to the address of base memory location 250 (at (B)); function pointer 235(2) is redirected to memory location 250(1) (at (B+1)); and function pointer 235(N) is redirected to memory location 250(N) (at (B+N)).

Figure 3:
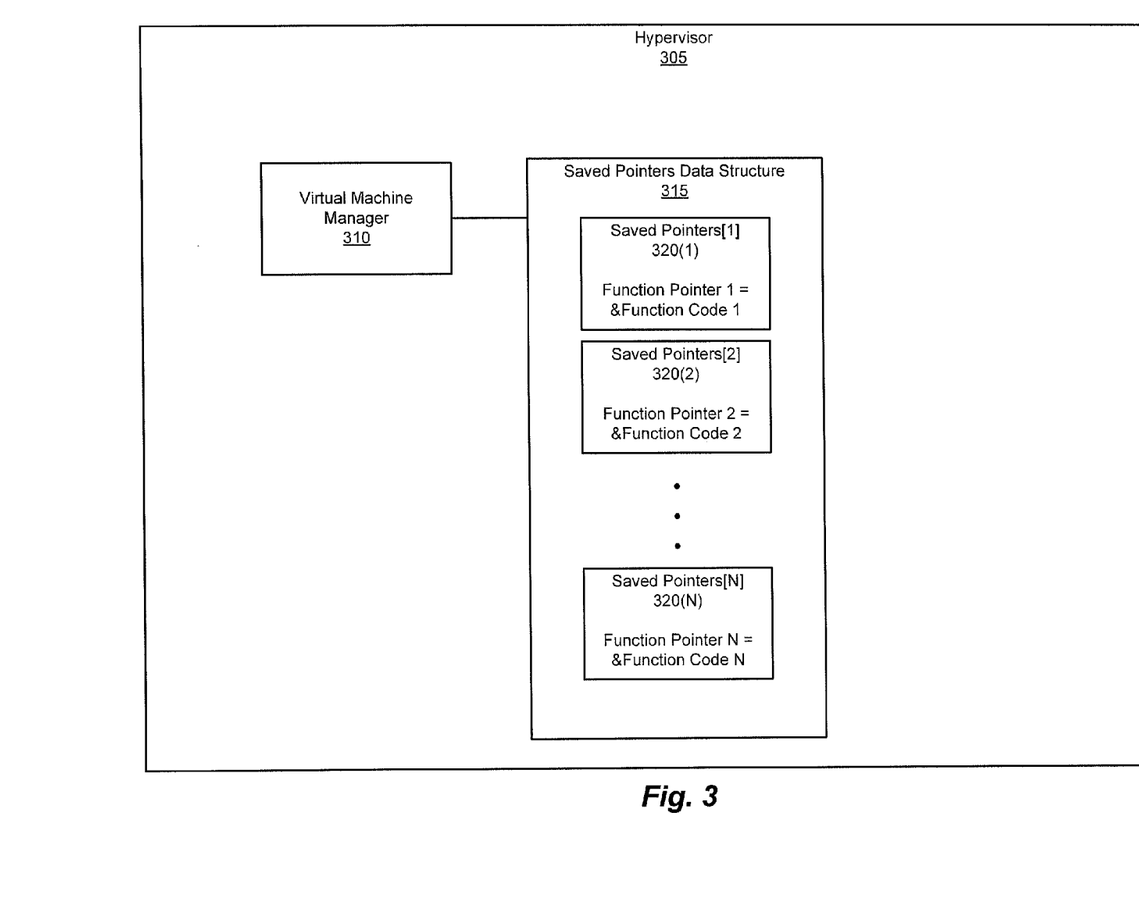
FIG. 3 is a block diagram illustrating a hypervisor for managing operations of guest virtual machines, according to one embodiment.

FIG. 3 is a diagram illustrating a hypervisor for managing the operation of virtual machines in a host computer system, according to one embodiment. Hypervisor 305 represents an implementation of hypervisor 105 of FIG. 1. As illustrated, hypervisor 305 includes virtual machine manager 310 and a saved pointers data structure 315.

Virtual machine manager 310 coordinates the operation of guest virtual machines in a host computer such as server 105 of FIG. 1. One technique used to monitor and modify the operation of the guest virtual machines involves hooking certain functions within those virtual machines. Through the use of function hooking, virtual machine manager 310 can perform the monitoring and modification operations without the need for altering or otherwise modifying the function code in the guest virtual machine. Modification of function code can be complex to implement and exposes the function code to exploitation by malicious software, among other risks and disadvantages.

Without function hooking, a virtual machine such as guest virtual machine 205 typically executes a function by simply using a function pointer that references a memory location at which the code for the function to be executed is stored. For example, referring to FIG. 2A and the example discussed earlier, guest virtual machine 205 executes Function 1 by accessing Function Pointer 1 at function pointer 235(1), which, in turn, references Function Code 1 at function code 240(1). However, without more, virtual machine manager 310 would be unable to determine that guest virtual machine 205 has requested execution of Function 1. Such is the case even if the need for such information is known a priori, because an architecture such as that shown in FIG. 2A possesses no mechanism for notifying a virtual machine manager of Function 1's execution, as a result of the logical separation between its hypervisor and virtual machines. Thus, in order for a virtual machine manager such as virtual machine manager 310 to be apprised of a request by guest virtual machine 205 to execute Function 1 (or for virtual machine manager 310 to be able to make such a determination), a mechanism is needed to allow virtual machine manager 310 to learn of a request for the execution of Function 1 by guest virtual machine 205. Such a mechanism can be provided, for example, by implementing a function hooking technique.

Referring once again to FIG. 2B, virtual machine manager 310 hooks a function call to Function 1 by allocating a hook page such as hook page 245 within kernel 215 of guest virtual machine 205. Virtual machine manager 310 then preserves the address of the original memory location, as referenced by its function pointer. That is, virtual machine manager 310 stores an association between the reference (function pointer) and the address of the memory location at which the function code begins. Thus, in the case of function pointer 235(1), this address is the address of the memory location of Function Code 1 (function code 240(1)) in kernel 215.

As shown in FIG. 3, the reference to original memory location is saved in a saved pointers data structure 315. Saved pointers data structure 315 can be implemented using one of any number of programmatic constructs that provide a number of locations for the storage of such pointers (depicted in FIG. 3 as saved pointers 320(1)-(N), and labeled as Saved Pointers [1]-[N]). More specifically, virtual memory manager 310 stores the reference to the original memory location (its address) in saved pointers 320(1). This reference is represented in FIG. 3 by "Function Pointer 1=&Function Code 1", where "& Function Code 1" is the address of the memory location at which Function Code 1 is stored within kernel 215 (a result of the "&" operation). Saved pointers data structure 315 can be implemented using a data structure such as an array, a record, an array of records, a table, and the like.

After saving the address of the original memory location in saved pointers data structure 315, virtual machine manager 310 redirects function pointer 235(1) to a memory location on hook page 245 (e.g., base memory location 250) by storing that memory location's address (B) therein. As shown in FIG. 2B, Function Pointer 1 (function pointer 235(1)) is redirected to base memory location 250. Thus, when function pointer 235(1) is accessed as part of Function 1 being called, guest virtual machine 205 attempts to execute code stored at B (base memory location 250) instead of Function Code 1.

In one embodiment, virtual machine manager 310 installs an execution event at B (base memory location 250). The execution event can be implemented as an "execution event callback," such that, when the function is called and the execution event triggered, virtual machine manager 310 receives a message from an event handler within hypervisor 305 (not shown) that specifies the particular function called (e.g., Function 1) and the virtual machine that called the function (e.g., guest virtual machine 205). Virtual machine manager 310 then performs one or more operations on behalf of guest virtual machine 205 in response to receiving the message that Function 1 was called. Typically, Function 1 will also be executed, though that need not necessarily be the case (e.g., hypervisor 305 can be designed, using multiple levels of indirection or the like, such that the thread of execution proceeds to another function or terminates, for example). For example, if Function 1 is executed in response to a possible malicious software infection, virtual machine manager 310 can send a message to a security virtual machine (e.g., security virtual machine 120 of FIG. 1) to begin scanning guest virtual machine 205 using an anti-virus component within virtual appliance application 125. In such a scenario, virtual machine manager 310 can also determine whether or not Function 1 should be executed, and proceed accordingly.

The event handler converts the execution event address (currently referenced by the function pointer) into an index to recover the original memory location referenced by the function pointer. For example, in the case in which Function 1 is called, the event handler takes the address of the execution event (e.g., B), subtracts the base physical address, and generates an index (e.g., 0, for Function Pointer 1, since Function Pointer 1 pointed to B, with 0 offset). Virtual machine manager 310 uses the calculated index to find the address of the original memory location referenced by Function Pointer 1 using saved pointers data structure 315 (e.g., Saved Pointers [1] of FIG. 3, which stores function pointer 1=&function code 1) and supplies the address of the original memory location to guest virtual machine 205, such that Function Code 1 is executed by guest virtual machine 205.

Figure 4:
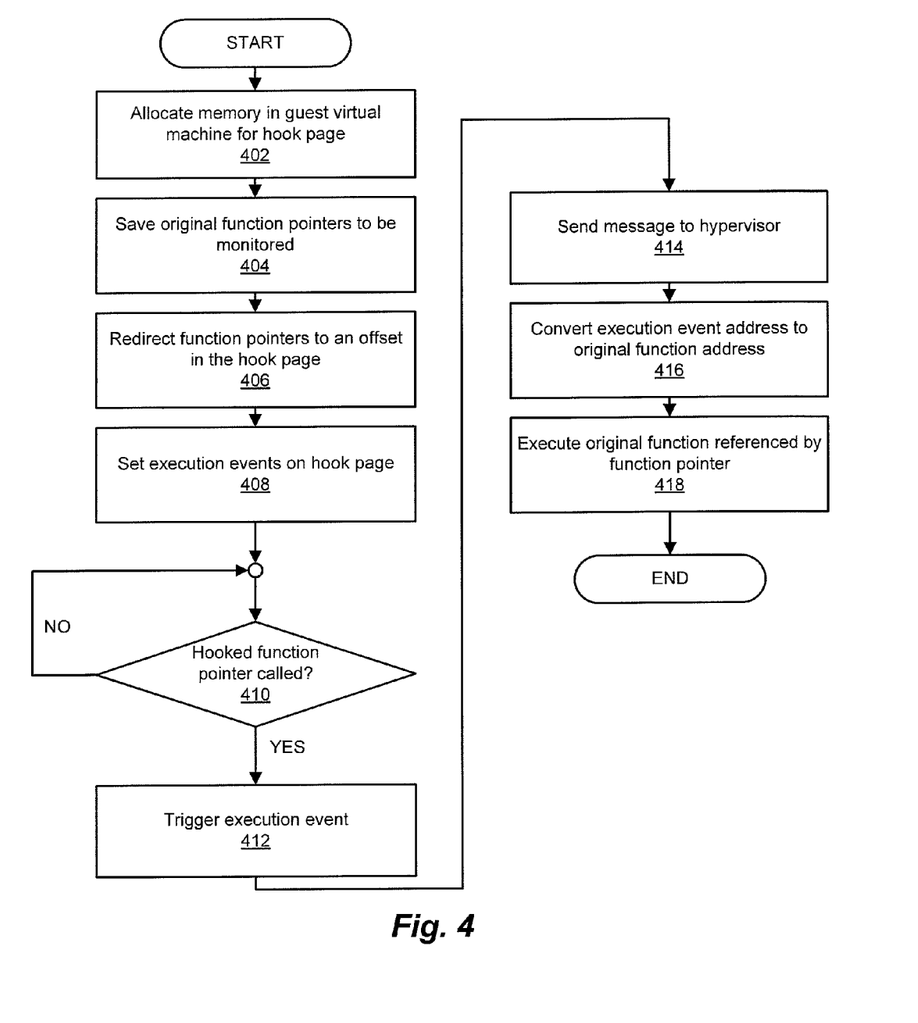
FIG. 4 is a high-level flowchart illustrating a method for managing operations within guest virtual machines, according to one embodiment.

FIG. 4 is a simplified flowchart illustrating an example method for managing operations within guest virtual machines. The process of FIG. 4 begins with the virtual machine manager of a hypervisor (e.g., virtual machine manager 310 of FIG. 3) allocating memory in a guest virtual machine (e.g., guest virtual machine 205 of FIG. 2B) for a hook page (e.g., hook page 245 of FIG. 2B), as shown in 402. For each function to be monitored (or hooked), the virtual machine manager creates an entry within a saved pointers data structure (e.g., saved pointers data structure 315 of FIG. 3) that forms an association between a function pointer and the address pointed to by the function pointer (shown in 404). As previously discussed, the address pointed to by the function pointer (a result of the "&" operation) is the address of the function code. The virtual machine manager modifies the function pointers to point to an offset in the hook page (406). The virtual machine manager sets execution triggers on the hook page, which notify the virtual machine manager when a particular function is called by the guest virtual machine.

The hypervisor then determines if a function, hooked by a hooked function pointer, has been called by the guest virtual machine (410). According to one embodiment, if the guest virtual machine calls a function that is hooked by the virtual machine manager, several operations are performed. First, the function is triggered by, an asynchronous event such as an interrupt, for example. The guest virtual machine encounters the interrupt and searches an interrupt descriptor table (e.g., interrupt descriptor table 230 of FIGS. 2A and 2B) for a function pointer that corresponds to the received interrupt. Once the appropriate function pointer is located, the function pointer is referenced, which further references a location on the hook page. The hook page location includes at least one execution trigger, which is triggered by the function pointer call (412). The execution event triggers the sending of a message that includes the execution trigger address. The message is sent to the virtual machine manager within the hypervisor (414). The virtual machine manager receives the message and converts the execution event address in the message to the original function code address using the saved pointers data structure. Optionally, the virtual machine manager can instruct a security virtual machine (e.g., security virtual machine 220) to perform one or more security operations in response to the execution event by sending a message to the security virtual machine. For example, the execution event can be triggered by a malicious software infection in the guest virtual machine. In response, the security virtual machine can be instructed (via, for example, the message sent by the virtual machine manager) to perform anti-virus scanning of the guest virtual machine using an anti-virus kernel component. In response to the virtual machine manager's receipt of the message, the virtual machine manager sends a message to the guest virtual machine with the original address of the function code to which the function pointer pointed (416). The guest virtual machine, using the original address, is then able to execute the function code (418).

An Example Computing Environment

Elements of network architecture can be implemented using a variety of computer systems and networks. An example of one such network environment is described below with reference to FIG. 5.

Figure 5:
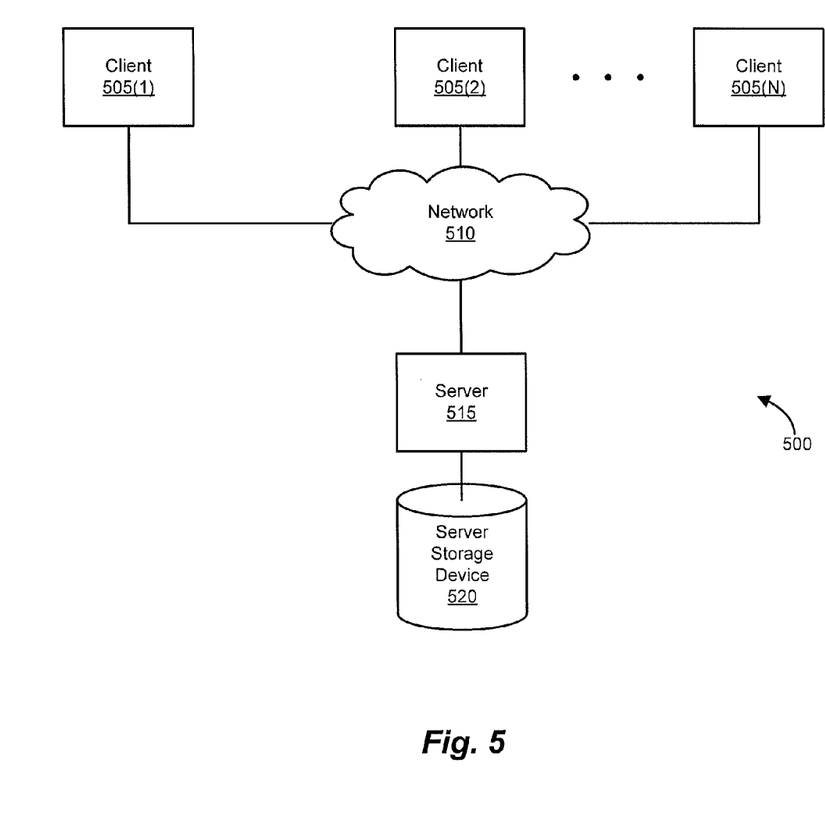
FIG. 5 is a block diagram illustrating a network architecture in which an embodiment of the present invention can be implemented.

FIG. 5 is a simplified block diagram illustrating a network architecture 500 in which one or more clients are provided with access to a server via various network connections. As depicted in FIG. 5, clients 505(1)-(N) are coupled to a network 510, and so are able to access a server 515 (which can be used to implement server 105 of FIG. 1) via network 510. A client can be implemented using, for example, a desktop computer, a laptop computer, a workstation, a server, a cell phone, a smart phone, a network-enabled personal digital assistant (PDA), or the like. An example of network 510, which can be used by clients 505(1)-505(N) to access server 515, is the Internet. Alternatively, access to server 515 can be provided by a local area network (LAN) utilizing Ethernet, IEEE 802.11x, or some other communications protocol. As will be appreciated, server 515 can be accessed by clients coupled directly thereto (not shown).

As also depicted on FIG. 5, server 515 is coupled to a server storage device 520. Server storage device 520 can be implemented as a single storage device or a collection of storage devices. Server storage device 520 can also be implemented as a storage area network, which couples remote storage devices to a server (e.g., server 515), such that the remote storage devices appear as locally-attached storage devices to the server's OS, for example.

In light of the present disclosure, those of skill in the art will appreciate that server storage device 520 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 500 can include other components such as routers, firewalls and the like that are not germane to the discussion of the present network and will not be discussed further herein. Those of skill in the art will also appreciate that other configurations are possible. For example, clients 505(1)-(N) can be directly coupled to server storage device 520 without the user of a server or Internet; server 515 can be used to implement both the clients and the server; network architecture 500 can be implemented without the use of clients 505(1)-(N); and so on.

Figure 6:
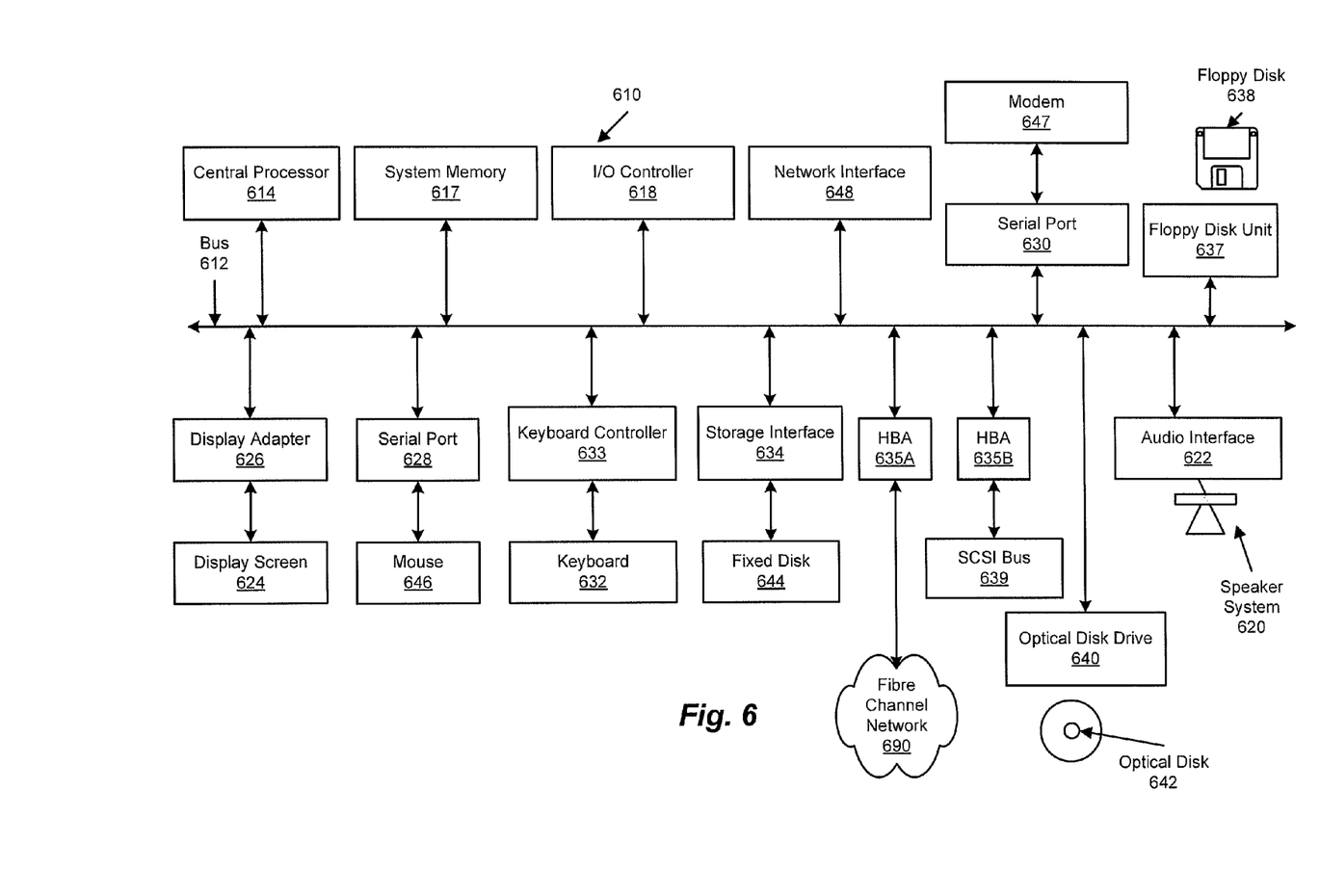
FIG. 6 is a block diagram that illustrates an example of a computer system suitable for implementing embodiments of the present invention.

FIG. 6 depicts a block diagram of a computer system 610 suitable for implementing a server (e.g., server 115 of FIG. 1), as well as the clients (e.g., clients 105(1)-105(N) of FIG. 1) used therein. Computer system 610 includes a bus 612, which interconnects major subsystems of computer system 610, such as a central processor 614, a system memory 617 (typically random-access memory (RAM), but which may also include read-only memory (ROM), flash ROM, or the like), an input/output controller 618, an external audio device, such as speaker system 620 via an audio output interface 622, an external device, such as a display screen 624 via display adapter 626, serial ports 628 and 630, a keyboard 632 (interfaced with keyboard controller 633), a storage interface 634, a floppy disk drive 637 operative to receive a floppy disk 638, a host bus adapter (HBA) interface card 635A operative to connect with a Fibre Channel network 690, a host bust adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown) and random access memory (RAM) (not shown), as previously noted. RAM is generally the main memory into which OS and application programs are loaded. ROM or flash memory can contain, among other code, the Basic Input-Output system (BIOS) which controls basic hardware operation such as the interaction with peripheral components. Applications resident with computer system 610 are generally stored on and accessed via a computer-readable storage medium, such as hard disk drive (e.g., fixed disk 644), an optical drive (e.g., optical drive 640), a floppy disk unit 637, or other computer-readable storage media.

Storage interface 634, as with other storage interfaces of computer system 610, can connect to a standard computer-readable storage medium for storage and/or retrieval of information, such as a fixed disk drive 644. Fixed disk drive 644 may be a part of computer system 610, or may be separate and accessed through other interface systems. Modem 647 can be employed to provide a direct connection to a remote server via a telephone link or to the Internet via an internet service provider (ISP). Network interface 648 may provide a direct connection to a remote server via a direct network link to the Internet via a point-of-presence (POP). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 6 need not be present. The devices and subsystems can be interconnected in different ways from that shown in FIG. 6. The operation of the computer system such as that shown in FIG. 6 is readily known in the art and is not discussed in detail in this application. Code to implement the previously-described features can be stored in computer-readable storage media such as one or more of system memory 617, fixed disk 644, optical disk 642, or floppy disk 638. The OS provided on computer system 610 can be, for example, MS-DOS®, MS-WINDOWS®, OS/2®, UNIX®, Linux®, or other known OS.

An example implementation of computer system 610, server 105 can store host operating system 110, hypervisor 115, security virtual machine 120, and guest virtual machines 130(1)-(N), all of FIG. 1, in computer-readable storage media (e.g., memory 617 and the like). Also, network interface 648 may be used by any of the modules described in server 105 and hypervisor 305. For example, the virtual machine manager can send and receive notifications concerning functions called within server 105 or in other parts of a network, as indicated in FIG. 6.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   redirecting a reference from a first address within a virtual machine to a second address within the virtual machine, wherein
   the reference initially points to the first address,
   the first address is an address of a function to be executed by the virtual machine,
   the second address is an address of a memory location in a memory page,
   the memory page is within the virtual machine, and
   an execution event is installed at the memory location; in response to a request, triggering the execution event, wherein
   the request results in the memory location being accessed; and
   in response to the triggering of the execution event, sending a message to a hypervisor,
   wherein the message indicates that the memory location has been accessed,
   the hypervisor is configured to store an association between the reference and the first address, and
   the association facilitates execution of the function by the virtual machine by facilitating provision of the first address to the virtual machine by the hypervisor.

2. The method of claim 1, further comprising: allocating the memory page within the virtual machine.

3. The method of claim 1, further comprising:
   installing the execution event at the memory location, wherein the first address and the second address are within an operating system of the virtual machine; and
   storing the association within the hypervisor.

4. The method of claim 3, further comprising:
   in response to receipt of the message by the hypervisor, determining the first address, using the association,
   sending the first address from the hypervisor to the virtual machine,
   and executing the function using the first address.

5. The method of claim 1, wherein
   the memory page is a non-pageable memory page; and
   the memory page is located in a kernel memory of the virtual machine.

6. The method of claim 1, further comprising:
   in response to receipt of the message by the hypervisor, triggering execution of a common kernel function by a security virtual machine, wherein
   the common kernel function performs a maintenance operation on the virtual machine.

7. A computer program product, comprising:
a computer-readable storage medium, wherein
a plurality of instructions are encoded in the computer-readable storage medium, and
the plurality of instructions comprise
a first set of instructions, executable on a computer system, configured to redirect a reference from a first address within a virtual machine to a second address within the virtual machine, wherein
the reference initially points to the first address, the first address is an address of a function to be executed by the virtual machine,
the second address is an address of a memory location,
the memory location is in a memory page within the virtual machine, and
an execution event is installed at the memory location;
a second set of instructions, executable on the computer system, configured to trigger the execution event, in response to a request, wherein
the request results in the memory location being accessed,
a third set of instructions, executable on the computer system, configured to send a message to a hypervisor, in response to triggering of the execution event, wherein
the message indicates that the memory location has been accessed,
the hypervisor is configured to store an association between the reference and the first address, and
the association facilitates execution of the function by the virtual machine by facilitating provision of the first address to the virtual machine by the hypervisor.

8. The computer program product of claim 7, wherein the instructions further comprise:
a fourth set of instructions, executable on the computer system,
configured to allocate the memory page within the virtual machine.

9. The computer program product of claim 7, wherein the instructions further comprise:
a fourth set of instructions, executable on the computer system, configured to install the execution event at the memory location, wherein the first address and the second address are within an operating system of the virtual machine; and
a fifth set of instructions, executable on the computer system, configured to storing the association within the hypervisor.

10. The computer program product of claim 9, further comprising:
a sixth set of instructions, executable on the computer system, configured to, in response to receipt of the message by the hypervisor, determine the first address, using the association,
send the first address from the hypervisor to the virtual machine, and
execute the function using the first address.

11. The computer program product of claim 7, wherein the memory page is a non-pageable memory page; and the memory page is located in a kernel memory of the virtual machine.

12. The computer program product of claim 7, further comprising:
a fourth set of instructions, executable on the computer system,
configured to trigger execution of a common kernel function by a security virtual machine, in response to receipt of the message by the hypervisor, wherein
the common kernel function performs a maintenance operation on the virtual machine.

13. A computer system comprising:
at least one processor;
a computer-readable storage medium coupled to the at least one processor; and
computer code, encoded in the computer-readable storage medium, configured to cause said processor to
redirect a reference from a first address within a virtual machine to a second address within the virtual machine, wherein the reference initially points to the first address,
the first address is an address of a function to be executed by the virtual machine,
the second address is an address of a memory location in a memory page,
the memory page is within the virtual machine, and
an execution event is installed at the memory location,
in response to a request, trigger the execution event, wherein
the request results in the memory location being accessed, and
in response to the execution event being triggered, send a message to a hypervisor,
wherein the message indicates that the memory location has been accessed,
the hypervisor is configured to store an association between the reference and the first address, and
the hypervisor is further configured to facilitate execution of the function by the virtual machine by virtue of being configured to provide the first address to the virtual machine, using the association.

14. The computer system of claim 13, wherein said computer code is further configured to cause said processor to:
allocate the memory page within the virtual machine.

15. The computer system of claim 13, wherein said computer code is further configured to cause said processor to:
installing the execution event at the memory location, wherein
the first address and the second address are within an operating system of the virtual machine; and
store the association between within the hypervisor.

16. The computer system of claim 15, wherein said computer code is further configured to cause said processor to:
in response to receipt of the message by the hypervisor, determine the first address, using the association,
send the first address from the hypervisor to the virtual machine, and
execute the function using the first address.

17. The computer system of claim 13, wherein
the memory page is a non-pageable memory page; and
the memory page is located in a kernel memory of the virtual machine.

18. The computer system of claim 13, wherein said computer code is further configured to cause said processor to:
trigger execution of a common kernel function by a security virtual machine, in response to receipt of the message by the hypervisor, wherein
the common kernel function performs a maintenance operation on the virtual machine.

19. The computer system of claim 13, wherein the second address is an address of a base memory location on the memory page.

20. The computer system of claim 13, wherein the reference is redirected in response to an interrupt.

* * * * *